(12) United States Patent
Choubey

(10) Patent No.: US 8,032,401 B2
(45) Date of Patent: Oct. 4, 2011

(54) SYSTEM AND METHOD TO CALCULATE PROCUREMENT OF ASSETS

(75) Inventor: Suresh K. Choubey, Delafield, WI (US)

(73) Assignee: General Electric Company, Schenectady, NY (US)

( * ) Notice: Subject to any disclaimer, the term of this patent is extended or adjusted under 35 U.S.C. 154(b) by 688 days.

(21) Appl. No.: 11/779,632

(22) Filed: Jul. 18, 2007

(65) Prior Publication Data
US 2009/0024491 A1 Jan. 22, 2009

(51) Int. Cl.
*G06F 17/50* (2006.01)
*G06F 9/44* (2006.01)

(52) U.S. Cl. ....... 705/7.11; 705/307; 706/15; 340/572.1

(58) Field of Classification Search .................. None
See application file for complete search history.

(56) References Cited

U.S. PATENT DOCUMENTS

| | | | |
|---|---|---|---|
| 5,444,820 A * | 8/1995 | Tzes et al. | 706/21 |
| 6,954,148 B2 | 10/2005 | Pulkkinen et al. | |
| 7,152,035 B1 * | 12/2006 | Suhy, Jr. | 705/1 |
| 2004/0103048 A1 * | 5/2004 | Vitulli et al. | 705/28 |
| 2004/0249655 A1 * | 12/2004 | Doeberl et al. | 705/1 |
| 2007/0281663 A1 * | 12/2007 | Sandholm et al. | 455/406 |
| 2007/0282476 A1 | 12/2007 | Song et al. | |
| 2009/0237253 A1 * | 9/2009 | Neuwirth | 340/572.1 |

OTHER PUBLICATIONS

Rent VS Buy Calculator by RSC Equipment Rental dated Jun. 15, 2006 (http://web.archive.org/web/20061015163820/http://www.rscrental.content/RentEquipment/whyRentvsbuy.aspx.*
Buy, Lease, or Rent by Masonry Magazine dated 2005 (http:masonrymagazine.com/11-05/buyleaserentn.html).*
The Equipment Equation by Grounds Maintenance dated Nov. 1, 2005 (http://web.archive.org/web/20060110083 12/http://grounds-mag.com/mag/grounds_maintenance_equipment_equation/).*
Approximations Algorithms, by Don Sheehy, dated Oct. 17, 2005, (http://www.cs.cmu.edu/afs/cs/academic/class/15854-f05/www/scribe/lec11.ps).*
Test Equipment: Weighing The Rent or Buy Decision by Anthony M. Schiavo, dated Dec. 1, 1975.*

* cited by examiner

*Primary Examiner* — Luna Champagne

(57) ABSTRACT

A system and method to calculate a mode of procurement of at least one asset is provided. The system comprises a tracking element operable to generate a signal representative of a location of the at least one asset, and a controller in communication with the at least one tracking element. The controller includes a processor operable to execute program instructions representative of the acts of measuring a utilization of the at least one asset having a unique identifier over at least one time interval, calculating a projected need of the at least one asset over a predetermined future time interval dependent on the utilization of the at least one asset, calculating a mode of procurement of the projected need of the at least one asset dependent on the projected need of the at least one asset, and displaying the mode of procurement to the user.

16 Claims, 5 Drawing Sheets

SYSTEM AND METHOD TO CALCULATE PROCUREMENT OF ASSETS

BACKGROUND OF THE INVENTION

This invention generally relates to a system for and method of managing procurement of assets, and more particularly, to a system and method to predict or forecast needs to purchase or rent assets, and to optimize the capital and operational expenses of an enterprise.

Larger industrial, healthcare or commercial facilities can be spread out over a large campus and include multiple floors each having multiple rooms. Each of the facilities can employ various assets used in manufacturing or providing services. For example, a healthcare facility or hospital employs numerous assets that can be spread out over a large campus and/or moved from room to room. Examples of assets include intravenous pumps, wheel chairs, digital thermometers, local patient monitors, patient bed, ventilators, etc. A similar scenario can be said for an industrial facility that includes various portable pumps, hoists, winches, etc.

BRIEF DESCRIPTION OF THE INVENTION

Facilities typically acquire or purchase assets on a purely speculative basis. There is a need for a system to improve efficiency in the purchase of assets on a per department basis that does not rely on pure speculation. There is also a need for a system to manage purchasing of assets that will improve efficiency in the purchase of assets on an overall basis for a series of individual departments comprising the facility. There is also a need to minimize the capital and operational expenditures while maintaining the inventory and working condition of the equipment for proper functioning and improved efficiency of the enterprise.

The above-mentioned shortcomings, disadvantages and problems are addressed by the embodiments described herein in the following description.

An embodiment of a system to calculate a mode of procurement of at least one asset is provided. The system comprises at least one tracking element operable to generate a signal representative of a location of the at least one asset; and a controller in communication with the at least one tracking element. The controller includes a processor in communication with a memory, the processor operable to execute a plurality of program instructions stored in the memory. The plurality of program instructions are representative of the acts of measuring a utilization of the at least one asset having a unique identifier over at least one time interval, calculating a projected need of the at least one asset over a predetermined future time interval dependent on the utilization of the at least one asset, calculating a mode of procurement of the projected need of the at least one asset dependent on the projected need of the at least one asset, and displaying the mode of procurement to the user.

An embodiment of a method of calculating a mode of procurement of at least one asset is provided. The method comprises the acts of measuring a utilization of the at least one asset having a unique identifier over at least one time interval; calculating a projected need of the at least one asset over a predetermined future time interval dependent on the utilization of the at least one asset; calculating a mode of procurement of the projected need of the at least one asset dependent on the projected need of the at least one asset, and displaying the mode of procurement to the user.

Systems and methods of varying scope are described herein. In addition to the aspects and advantages described in this summary, further aspects and advantages will become apparent by reference to the drawings and with reference to the detailed description that follows.

DETAILED DESCRIPTION OF THE INVENTION

In the following detailed description, reference is made to the accompanying drawings that form a part hereof, and in which is shown by way of illustration specific embodiments, which may be practiced. These embodiments are described in sufficient detail to enable those skilled in the art to practice the embodiments, and it is to be understood that other embodiments may be utilized and that logical, mechanical, electrical and other changes may be made without departing from the scope of the embodiments. The following detailed description is, therefore, not to be taken in a limiting sense.

Figure 1:
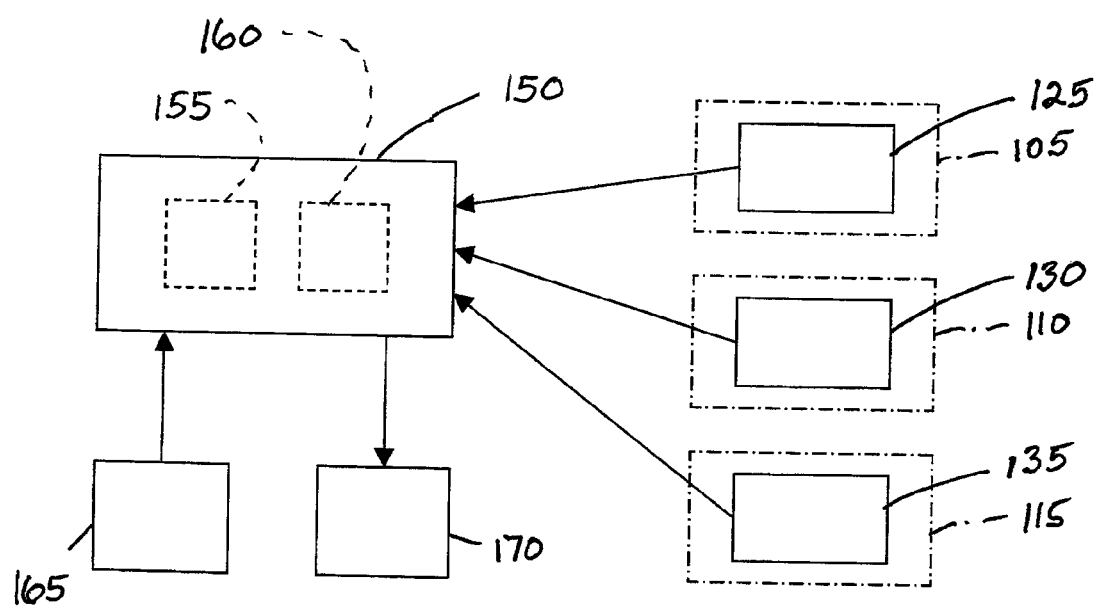
FIG. 1 shows a schematic block diagram of an embodiment of a system operable to manage purchasing of assets of a healthcare facility.

FIG. 1 illustrates one embodiment of a system 100 to manage purchasing of assets 105, 110 and 115 at a facility or entity. Examples of the facility or entity can be a hospital, clinic or other healthcare provider with one or more patient rooms or departments located over one or more buildings. The entity can also include a cluster of hospitals or clinics or combination thereof of designated parameter (e.g., number of patient rooms, number of departments, number of patients, etc.) of similar comparison.

An embodiment of the series of assets 105, 110 and 115 can include medical devices or entities which have value, and which are affiliated with the patient experience at a hospital, clinic, or other type of healthcare facility. An embodiment of the first asset 105 can be an intravenous pump, the second asset 110 can be a wheelchair, and the third asset 115 can be a healthcare personnel, or can represent a type of a series or group thereof. The assets 105, 110, and 115 can be stationary or mobile. Yet, the number and types of assets 105, 110 and 115 can vary. Although the following description is in reference to assets 105, 110 and 115 associated with a hospital or healthcare facility, it should be understood that the subject matter is not so limited. The assets 105, 110 and 115 can be associated with various industrial or commercial environments or facilities.

The system 100 includes a series of tracking elements 125, 130, and 135 located for each asset 105, 110 and 115, respectively. The tracking elements 125, 130, and 135 are generally operable to create a signal indicative of a location or state of the respective assets 105, 110 and 115. Examples of the tracking elements 125, 130, and 135 can include a geographic positioning system (GPS) receiver in communication with a satellite, electromagnetic receivers and transmitters, radio frequency identification (RFID) tags, radio frequency (rf) transmitters and receivers, bar code, or the like or combination thereof operable to locate a position (e.g., a room location at a facility, a geographic location having a latitude and longitude, a coordinate, etc.) of the respective assets 105, 110, and 115 relative to a reference. The type of technique of tracking (e.g., electromagnetic, optical, global positioning relative to a satellite, etc.) can vary.

The system 100 further includes a controller 150 in communication with the tracking elements 125, 130, and 135 so as to track movement of the assets 105, 110 and 115 between various states or locations. The communication of the controller 150 with the tracking elements 125, 130, and 135 can be via a wireless connection (e.g., radio frequency, etc.) or wired connection (e.g., communication bus, etc.) or combination thereof to track movement of the series of assets 105, 110 and 115. Communication can be direct, or over an Internet network or an Ethernet network or a local area network (LAN).

An embodiment of the controller 150 can include a computer in a desktop configuration or laptop configuration. Yet, the type of controller 150 can vary. The controller 150 generally includes one or more processors 155 in communication with a memory 160 having a computer-readable storage medium (e.g., compact disc (CD), DVD, memory stick, random access memory (RAM), random operating memory (ROM), etc.). The storage medium is generally operable to receive and record a plurality of programmable instructions for execution by the processor 155.

An embodiment of the controller 150 is also connected in communication with an input device 165 and an output device 170. The input device 165 can include one or combination of a keyboard, touch-screen, remote computer workstation, mouse, joystick, tracker ball, etc. or the like operable to receive data from an operator. The output device 170 can include a display comprising one or combination of a monitor, an alarm, light emitting diodes (LEDs), printer, audible speaker, pager, personal data assistant (PDA), etc. operable to visually or audibly show an output of the controller 150 for illustration to an operator. The controller 150 can also be connected in communication with a remote computer or workstation (not shown).

Figure 2:
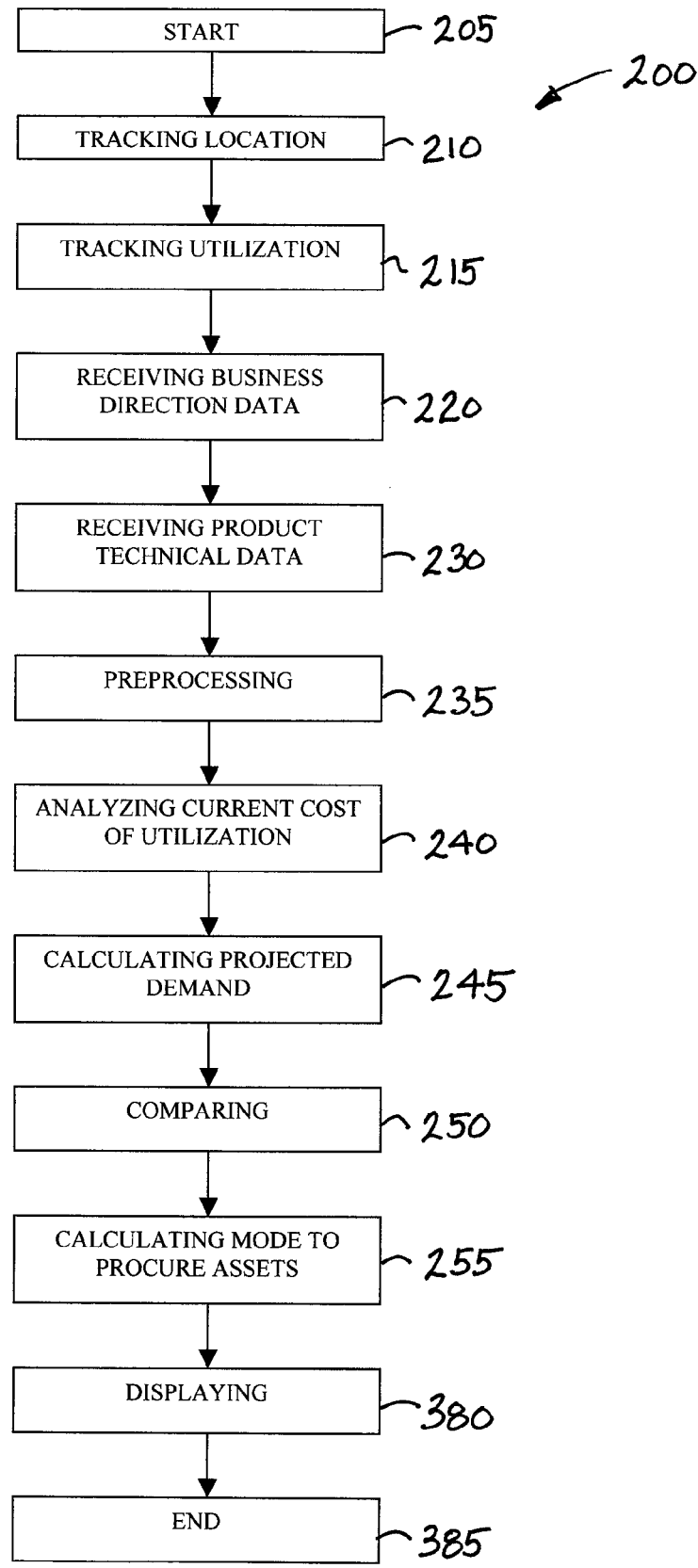
FIG. 2 illustrates an embodiment of a method to calculate a mode of procurement of a projected need of the assets of the system described in FIG. 1.

Having described a general construction of one embodiment of the system 100, the following is a general description of an embodiment of a method 200 to calculate a mode or manner or fashion to procure one or more of the assets 105, 110, and 115 at the facility, as illustrated in FIG. 2. It should also be understood that the sequence of the acts or steps of the method 200 as discussed in the foregoing description can vary. Also, it should be understood that the method 200 may not require each act or step in the foregoing description, or may include additional acts or steps not disclosed herein.

FIG. 2 illustrates one embodiment of the method 200. Act 205 includes the start of the method 200. Act 210 includes tracking a location of each asset 105, 110, and 115. An embodiment of act 210 includes receiving a signal via the tracking element 125, 130, and 135 representative of a location data of each asset 105, 110 and 115 in combination with a unique identifier of the asset 105, 110, and 115 on a periodic or continuous basis. Act 210 can further include receiving a status or health (e.g., in need of repair, in need of maintenance, etc.) of the asset 105, 110, and 115.

Act 215 includes tracking or measuring utilization of each asset 105, 110, and 115 or type thereof and communicating the measurement data to the controller 150. An embodiment of act 215 includes calculating a utilization of assets of each type or category of assets (e.g., intravenous pumps, wheelchairs, etc.) and on an individual asset basis (e.g., wheelchair No. 1, wheelchair No. 2, etc.). Utilization can be measured by incremental time periods (e.g., minutes, hours, days, etc.) that each asset 105, 110, and 115 spends or is identified at a particular status indicator or state. The utilization of the assets 105, 110, and 115 is represented by the state or status indicators described above and as shown in FIG. 3. An embodiment of calculating utilization includes calculating or measuring the period of time that the asset 105, 110, and 115 spent in a recognized state. For example, the act of calculating utilization can include calculating a percentage of actual demand or utilization of the at least one asset 105, 110 and 115 over a time interval.

In one example, the utilization status is communicated with location data for the asset 105, 110, and 115. In another example, the acquired data for the utilization status can be equated to the acquired location data of the asset 105, 110, and 115. Predetermined status identifiers or index of utilization can be stored in correlation or equated to various locations of the assets 105, 110, and 115. A status indicator can be "not in use" if a location of one of the assets 105, 110, and 115 is in a storage room, a dirty room, a cleaning room, or a service room while a status indicator can be "in use" if the location of the asset 105, 110, and 115 is in a patient room. An embodiment of act 215 includes communicating the tracked use for illustration on the display 280.

Examples of calculating utilization of the assets 105, 110, and 115 include calculating daily asset utilization that is generally equal to a sum (in hours/day) of utilization or use of each type of asset 105, 110, and 115 divided by number of a type of assets 105, 110, and 115; calculating a weekly asset utilization that is generally equal to a sum of daily asset utilization for a calendar week for each type of asset 105, 110, and 115 divided by sevens day/week; calculating a monthly asset utilization that is generally equal to sum of daily asset utilization of each type of asset 105, 110, and 115 for a calendar month divided by number of days in calendar month; and calculating a yearly asset utilization that is generally equal to sum of daily asset utilization for calendar year for each type of asset 105, 110, and 115 divided by number of days in a calendar year. Act 215 can further include normalizing the utilization of the assets 105, 110, and 115 according to a number of effective operational hours in a day at the entity (e.g., entity is only open to the public for twelve hours per day).

Figure 3:
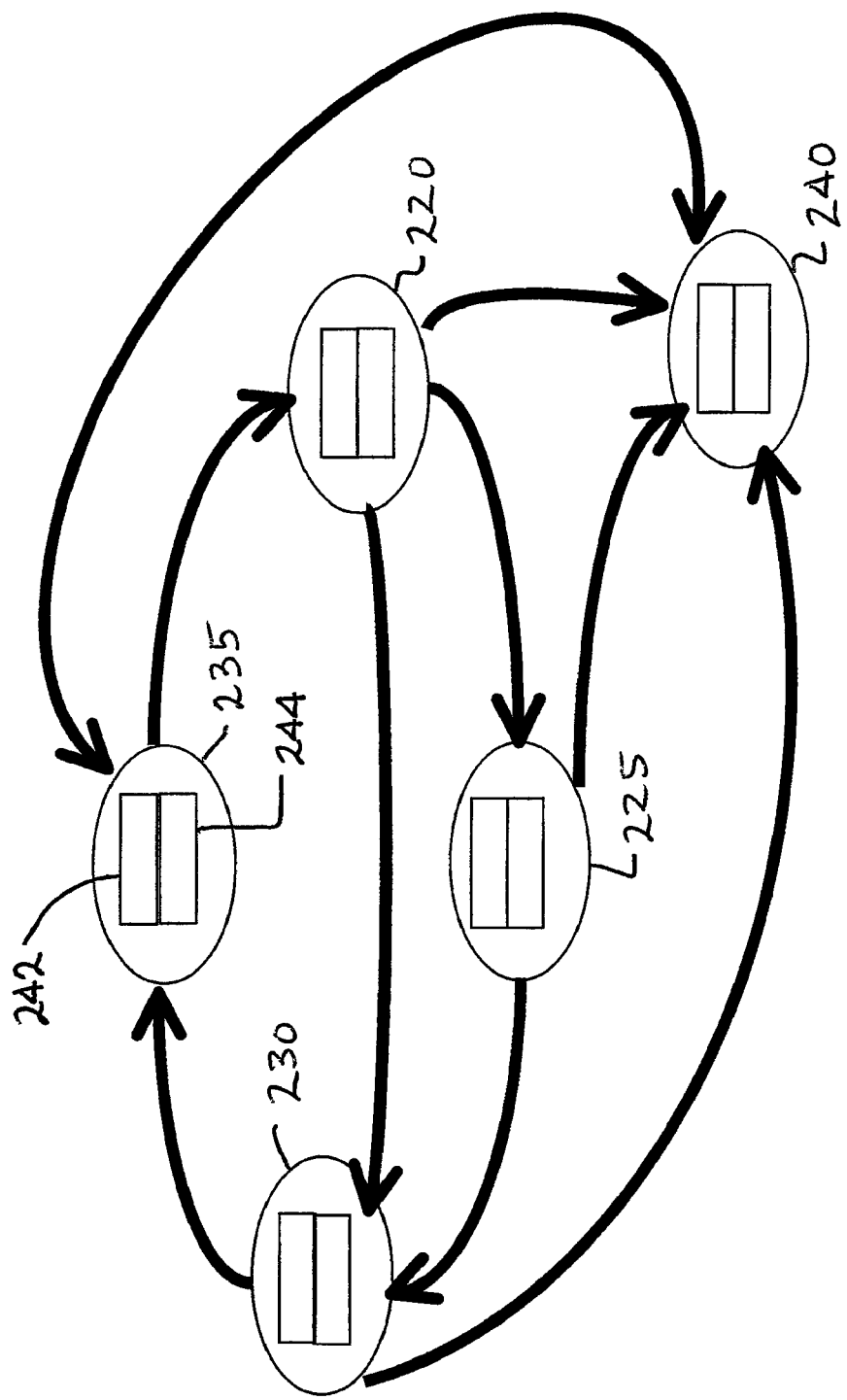
FIG. 3 shows an embodiment of a schematic block diagram illustrative of tracking a utilization of the assets described in FIG. 1.

Referring now to FIG. 3, one embodiment of the various states or status indicators of utilization of each asset 105, 110, and 115 at any given time as tracked in act 215 includes a USE status or state 220, a DIRTY state 225, a CLEANING state 230, an INVENTORY state 235, and a SERVICE state 240 of each of the assets 105, 110, and 115. The USE state 220 represents the assets 105, 110, and 115 being utilized by a patient or subject either in a patient room or with the patient transitioning from one point or location to another (e.g., for a walk, to get testing, etc.). The DIRTY state 225 represents the assets 105, 110, and 115 being temporarily stored before being taken to a location of a CLEANING state 230 or, if malfunctioning, to the SERVICE state 240. The CLEANING state 230 represents status of the assets 105, 110, and 115 in the process of being cleaned of contamination or under routine maintenance so as to be available for future utilization according to the USE state 220. The INVENTORY state 235 represents status of the assets 105, 110, and 115 that have previously been moved from the CLEANING state 230 and are now in storage and ready for use in accordance with the USE state 220 described above. The SERVICE state 240 represents status of the assets 105, 110, and 115 after malfunctioning or requiring repair or to be discarded.

An embodiment of act 215 can include tracking the status indicator of one or more of the assets 105, 110, and 115 having the unique identifier on a continuous or periodic basis. In one example, the status is communicated with location data for the asset 105, 110, and 115 from the respective tracking elements 125, 130, and 135. In another example, the status indicator can be automatically assigned in accordance to a predetermined schedule correlating each of the series of status indicators to one or more possible detected or tracked locations of each of the assets 105, 110, and 115. For example, a status indicator can be automatically assigned to the unique identifier of the asset to be in the USE state if the location of the asset 105, 110, and 115 is detected to be in a patient room or location correlated according to a predetermined schedule to the USE state. Alternatively, the status indicator can be manually entered at the input 156 to the controller 150 for each asset 105, 110, and 115.

Act 220 includes receiving data of predictive parameters associated with a future business plan or direction correlated with a predicted change in utilization of one or more of the assets 105, 110, and 115 looking forward in time. Examples of a predicted business direction change in utilization of the assets includes identifying a first factor representative of a predicted increase or decrease in services associated with utilization of the assets, identifying a second factor representative of a predicted change in demand for utilization of the assets associated with a change in competition or government regulations or in view of an expected creation of a new department.

Act 230 includes receiving data of designated technical parameters associated with each asset or type thereof. Examples of technical parameters include expected expiration date, efficiency, purchase cost to replace, rental or lease cost, dates and list of routine maintenance items, expected release date of new model or evolving technology, etc.

Act 235 includes integrating, cleaning, and pre-processing the received data in a conventional manner to reduce the data as well as to place or modify the data into a desired format. Reducing the data can include vertical or horizontal reduction. An embodiment of vertical reduction includes applying a reduction algorithm operable to remove data for parameters from consideration that is calculated to be not contributive to the calculation of utilization demand or the calculation of the mode of procurement. An embodiment of horizontal reduction includes aggregating data (e.g., averaging, selecting minimum value, selecting maximum value, etc.).

Act 240 includes analyzing the data of act 235 to calculate and display costs associated with current utilization of the assets 105, 110, and 115. Act 245 includes calculating a projected demand or utilization of the at least one asset 105, 110, and 115. An embodiment of the act 245 includes calculating a trend or slope of the acquired or historical data for the measured utilization of the asset 105, 110, and 115 over a selected time interval. The act 245 can include executing a linear or non-linear regression analysis, a least squares analysis, or other conventional mathematical techniques to calculate a slope (e.g., assets per day) approximating the trend in the acquired data of the utilization of the selected asset 105, 110, and 115 over the selected time interval (e.g., 365 days, monthly). The act 245 can further include aggregating (e.g., minimum, maximum, average, sum, count, etc.) and/or normalizing the slope (e.g., to a value of one). The act 245 can further include multiplying the calculated slope with a selected projected time interval so as to calculate the projected demand or utilization of the asset 105, 110, 115 for the projected time interval. The calculated projected demand can be adjusted with one or more periodically upgraded factors for existing assets 105, 110 and 115 and one or more business direction factors. For example, the upgrade factor can be adjusted based on comparison of performance of existing to new assets 105, 110, and 115. The factors can also be representative of a predicted useful life of the asset 105, 110, 115. Values of the factors for the performance or useful life can be updated based on the acquired data from the assets 105, 110, and 115 over time.

An embodiment of calculating the projected demand looking forward in time can also adjusted by a business adjustment factor representative of a business direction as indicated by the user. For example, the business adjustment factor can be calculated to reflect inputted user information for expansion or shrinkage of the facility, addition or removal of departments or services, local competition, etc. received via the user input device 165. The projected demand would then be calculated by multiplying the number of assets 105, 110, and 115, the normalized value of the calculated slope approximating the trend in demand, the upgrade factor, and the business adjustment factor. Act 245 can further include communicating the projected demand over the projected time interval for illustration or display at the output device 170. An example of the projected demand can be for a projected rental demand of the selected asset 105, 110, and 115. An embodiment of act 245 can also include dependence on parameters for demographic changes of each department, growth of each department, etc., and adjusting the projected demand in accordance or in correlation to the value of the parameters. For example, act 245 can include calculating a patient increase factor (PIF) for each department of the entity, and multiplying the projected demand with the (PIF) to compute an adjusted projected demand.

For example, the acquired asset utilization data per day is used in an algorithm to calculate values of parameters in calculating a prediction of a number of each type of asset 105, 110, and 115 in the entity. According to this example, daily asset utilization data acquired for a particular type of asset 105, 110, and 115 is aggregated to three days, five days, thirty days, and twelve months. The daily utilization, three-day utilization, five-day utilization, thirty-day utilization, and twelve-month utilization are implemented as parameters in the algorithm to predict a future need of the assets 105, 110, and 115. Other additional parameters implemented to predict future needs of assets 105, 110, and 115 include evolution parameters of the assets 105, 110, and 115, financial parameters, commercial parameters, entity growth parameters, etc. The above-described forecast or predicted demands or needs of each asset 105, 110, and 115 or asset type thereof is aggregated for illustration to the user.

Act 250 includes comparing the predicted or future need of each type of asset with the number of current assets 105, 110, and 115. An embodiment of act 250 includes calculating whether a rearrangement or movement of surplus of assets 105, 110, and 115 at certain location or department can meet the predicted demand at another location or department.

If it is calculated or identified that there is an insufficient number of one or types of assets 105, 110, and 115 to satisfy a predicted need or demand at a location or department as calculated in act 248, then act 255 includes calculating a mode (e.g., purchase, lease, rent, etc.) to procure or acquire assets 105, 110, and 115. An embodiment of act 255 includes calculating a predicted or projected cost for the projected demand of the asset 105, 110, and 115 for various modes of procurement. An embodiment of the act 255 can include comparing the projected costs for several alternatives manners of procurement to meet the projected demand. For example, the act 255 can include receiving a rental rate and at least one rental rule for the at least one asset, and multiplying a projected rental rate based on the rental rate and the projected rental demand for the selected time interval. The act 255 can also include receiving a purchase cost and a depreciation rate of the at least one asset 105, 110, and 115, and calculating a projected value of the least one asset 105, 110, and 115 equal including the purchase cost less the depreciation rate multiplied by the projected rental time interval. An embodiment of act 255 can also include communicating the at least one projected cost for each manner of procurement for illustration or display at the output device 170. An embodiment of act 255 can also include calculating a recommended number of assets of a particular type to be procured via a combination of purchasing, renting, or leasing in accordance to the calculated trend in utilization described above.

Act 255 can also include comparing the analyzed data calculated above for illustration to the user. An embodiment of the act 255 can include illustrating the projected purchase value of the least one asset 105, 110, and 115 in comparison to the rental cost for the projected rental time interval. Act 255 can also include comparing one or more of the calculated utilization, projected demand, and projected cost to other data acquired by other facilities (e.g., different healthcare networks, different hospitals, etc.) or clusters thereof of similar characteristics for comparison, the other data stored at the embodiment of the controller 150 that is in communication with a series of facilities or entities of different ownership or corporation.

An embodiment of act 255 can further include creating and executing a recurrent neural network classifier algorithm operable to generate the output of the best mode of procurement of assets 105, 110, and 115 for illustration to the operator. The classifier algorithm is configured to produce a binary output or result representative of a best mode of whether to procure the assets 105, 110, and 115 via purchase versus rent/lease. Parameters or factors incorporated in the classifier algorithm to calculate the best mode (e.g., purchase, lease, rent, etc.) to procure the assets 105, 110, and 115 includes price (purchase price versus rent/lease cost), parameter representative of an availability of the asset, buying a parameter representative of a favorability of terms of purchase in comparison to terms of rent/lease, parameter representative of a degree of change in product evolution versus current asset, a parameter representative of a business direction of the entity (e.g., expansion or contraction of budget), change in tax laws, change in inflation, etc.

Figure 4:
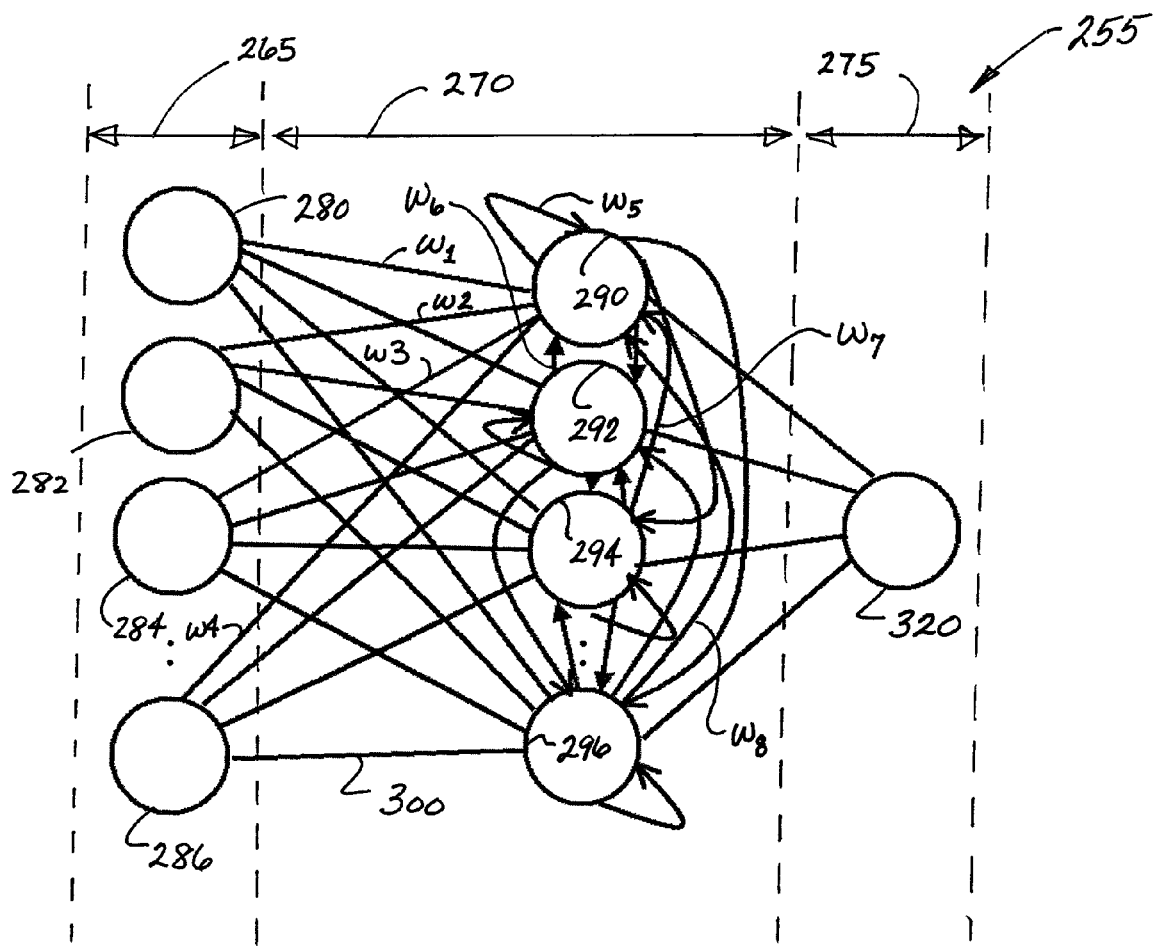
FIG. 4 shows a schematic diagram illustrative of an embodiment of a recurrent neural algorithm operable to calculate a mode to procure a projected need of an asset.

FIG. 4 illustrates a schematic diagram of one embodiment of the recurrent neural classifier algorithm of act 255. The embodiment of the classifier algorithm employs a Recurrent Neural Network technique to calculate a best mode to procure the assets 105, 110, and 115. Yet, alternative fuzzy neural network techniques or a Back Propagation trained Multilayer Perception (MLP) technique can be used or in combination with the described recurrent neural classifier algorithm of act 255.

The embodiment of the recurrent neural network algorithm generally includes a plurality of input layer nodes 265, hidden layer or empirical nodes 270, and output layer of nodes 275 arranged in representation of a mathematical model to calculate a best mode (e.g., purchase, lease, rent, etc.) to procure the assets 105, 110, and 115. Of course, the number or arrangement of the nodes in each layer 265, 270, and 275 can vary.

Each node generally represents a mathematical formula of comparison to produce a binary result or value. For example, one embodiment of the input layer of nodes 265 includes a series of nodes 280, 282, 284, 286 each representative of a summation of input values received or acquired for the following group of parameters: one-day average node 280, three-day average node 282, five-day average node 284, thirty-day average node 286 representative of measured parameters of asset utilization. Yet, the input layer of nodes can include additional nodes representative of other parameters of asset utilization (e.g., a three-month average (a90), and one-year average (a356) of measured asset utilization). The result or output communicated from each of the input nodes 280, 282, 284, and 286 is generally representative of a state of the node. One embodiment of the states of the nodes includes binary values 0, 1, and 2. Yet, values of the states of the nodes can vary.

The embodiment of nodes 290, 292, 294, and 296 comprising the hidden layer of nodes 270 are joined or coupled by a series of connections 300 to receive the output or states of the nodes in the input layer 265. Each connection 300 leading from the input nodes 280, 282, 284, 286 generally represents an assigned empirical value of a weight to be multiplied by each value or state of the input layer node 280, 282, 284, and 286 that the connections 300 leads from. Each node 290, 292, 294, 296 in the hidden layer 270 is also coupled by a connection 300 to itself. An embodiment of each node 290, 292, 294 and 296 of the hidden layer of nodes 270 and the output layer of nodes 275 is representative of a summation of all input values or states correlated to the input nodes 280, 282, 284 and 286 joined by connections 300 thereto multiplied by the above-described empirical values of weights of the joining connections 300 from the respective input nodes 280, 282, 284, 286 to the nodes 290, 292, 294, 296 of the hidden layer of nodes 270 for comparison relative to a predetermined threshold value.

As a specific example, node 290 represents the following mathematical summation: (node 280\*w1+node 282\*w2+node 284 w3+node 286 w4+node 290\*w5+node 292\*w6+node 294\*w7+node 296\*w8+ . . . node n\*wn) for comparison to a predetermined threshold, where w1, w2, w3, w4, . . . , wn are assigned empirical values represented by the connections 300 joining the respective input nodes 280, 282, 284, 286, 290, 292, 294, 296, etc. to the hidden layer node 290. The other nodes in the hidden layer and the output layer represent similar mathematical functions or formulas. Alternatively, it should be understood that the nodes can represent other types of mathematical functions, formulas or equations than the subject matter described herein.

In a similar manner to that described above, the result or outcome of the comparison at the output node 320 of the output layer 274 is equated to a binary value or state of 0, 1 or 2 of the node. Each binary value or state of the output layer node 320 is correlated or associated to a best mode (e.g., purchase=0 versus lease/rent=1, or other procurement means=2) to procure or acquire the assets 105, 110, and 115.

Figure 5:
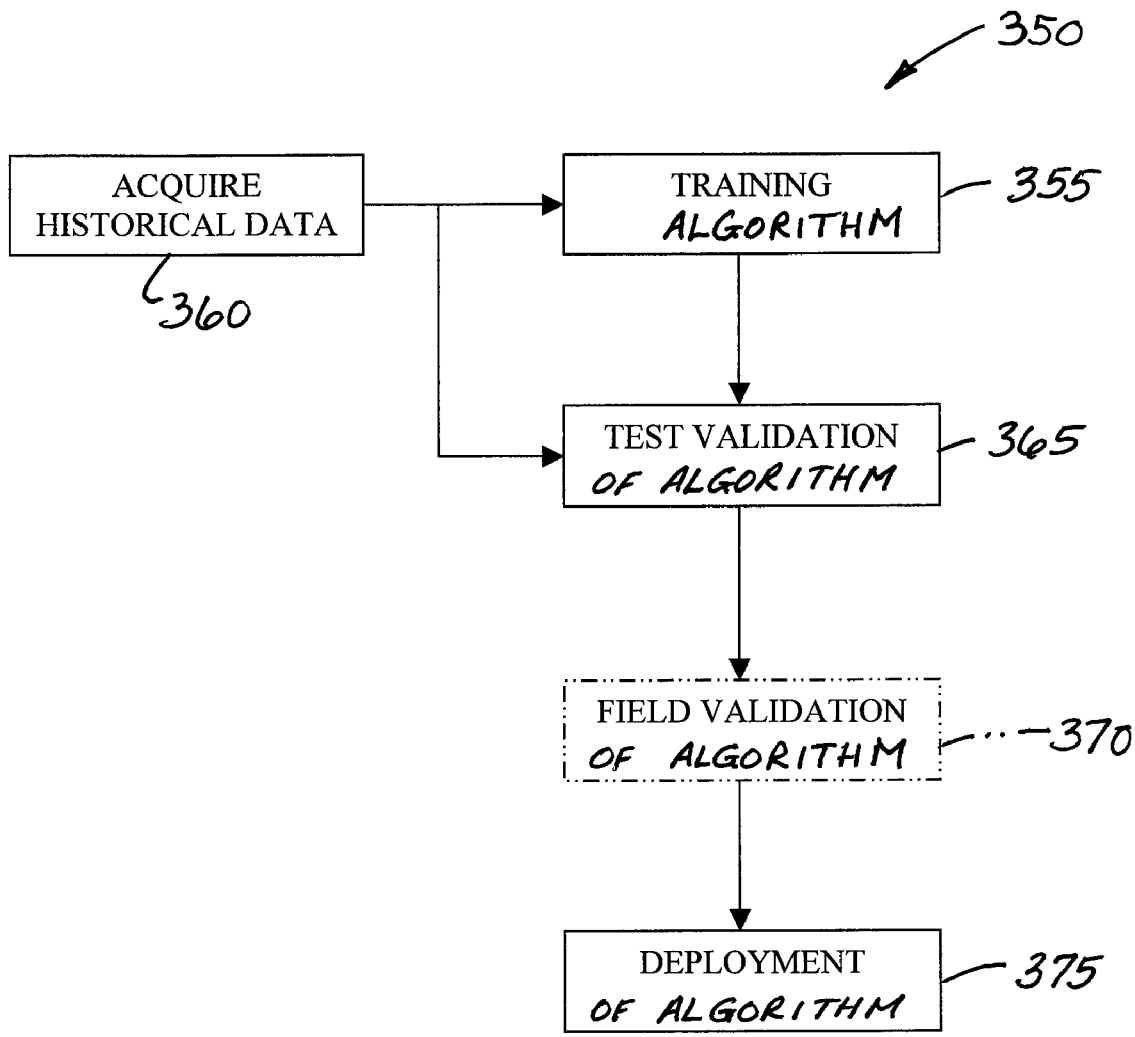
FIG. 5 illustrates a schematic diagram illustrative of an embodiment to validate the algorithm of FIG. 4 dependent on historical outcomes of a mode of procurement correlated to a known input.

Referring to FIG. 5, an embodiment of the act 255 further includes an act 350 of executing a back propagation technique to calculate the empirical values or weights represented by the connections 300. Referred to as training the model of the algorithm, act 355 includes calculating empirical values (e.g., w1, w2, w3, w4, etc.) for the connections 300 in a backward manner or fashion based on acquired predetermined acceptable errors for historical data of input values known to produce known outcomes (illustrated by reference 360) of the best mode or manner to procure assets 105, 110, and 115. The act of training 255 creates or adjusts the algorithm to be consistent with previous/past decisions of the best mode to procure projected demands of assets 105, 110, 115. Calculated values for the weights as determined using the back propagation technique dependent on historical outcomes are then adopted as the current model of the algorithm to calculate or generate outcomes of the manner to procure a projected demand of the assets 105, 110, and 115.

Act 365 includes validating the model. An embodiment of act 365 includes testing whether other acquired historical input values will produce consistent historical outcomes of the mode or manner to procure the assets 105, 110, and 115. A calculated number of false positives and negatives of outcomes to procure the assets 105, 110, and 115 are compared to a threshold indicative of whether the model of the algorithm is acceptable for deployment or not acceptable. Act 370 includes an optional step or act of validating the model in the field by employing the model to calculate outcomes of whether to purchase and lease/rent for random input. Act 375 includes deploying the model of the algorithm to be used by customers in calculating the mode or manner to procure a predicted need for assets 105, 110, and 115.

Referring back to FIG. 2, Act 380 includes displaying the mode or manner to procure the predicted need for the assets 105, 110, and 115 at the output device 170 to the user. Act 385 is the end of the method 200.

A technical effect of the system 100 and method 200 described above is to execute a calculation of a need of one or more assets based on historical data of asset utilization, clustering or segmentation of individual entities (third party entities such as hospitals, clinics, etc. of similar infrastructure and willing to share data and analytic output generated using the system and method), and values indicative or representative of a business direction of the entity looking toward the future. Another technical effect includes generating an output for a current state of asset utilization compared to third party entities with similar infrastructure and willing to share asset utilization data and analytic output using the system and method. Yet another technical effect includes generating plans to improve utilization of existing assets, as well as recommending disposal of existing assets and procurement of new assets.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A system to calculate a mode of procurement of at least one asset, the system comprising:
   at least one tracking element operable to generate a signal representative of a location of the at least one asset; and
   a controller in communication with the at least one tracking element, the controller including a processor in communication with a memory, the processor operable to execute a plurality of program instructions stored in the memory, the plurality of program instructions representative of the acts of:
   measuring a utilization of the at least one asset having a unique identifier over at least one time interval;
   calculating a projected need of the at least one asset over a predetermined future time interval based upon the measured utilization of the at least one asset over the at least one time interval;
   calculating a mode of procurement of the at least one asset based upon the projected need of the at least one asset using a recurrent neural network algorithm which comprises calculating automatically adjustable empirical weights using back-propagation, wherein back-propagation comprises using a predetermined error of historical input values to produce a historical outcome;
   adopting the automatically adjustable empirical weights into the recurrent neural algorithm; and
   displaying the mode of procurement to the user;
   wherein the act of calculating the projected need is based upon at least one parameter from the group comprising an upgrade factor of switching from an existing asset to a new asset, a predicted useful life of the at least one asset, a business adjustment factor representative of a business direction indicative of expansion of patient services in view of local competition, and a patient increase factor (PIF) representative of a projected increase in patient care.

2. The system of claim 1, wherein the act of measuring the utilization of the at least one asset includes calculating at least one average utilization of the at least one asset over a predetermined time period on a continuous basis, and wherein the mode of procurement includes one of the group consisting of a purchase of the at least one asset and a rental of the at least one asset.

3. The system of claim 1, wherein the act of calculating the mode of procurement of the at least one asset further comprises using a plurality of parameter values of projected utilization of the at least one asset over different time intervals.

4. The system of claim 1, wherein an outcome of the recurrent neural network algorithm is a binary value representative of the mode of procurement of the at least one asset.

5. The system of claim 1, the plurality of program instructions further representative of the acts of:
   testing whether the recurrent neural network algorithm produces an outcome of the mode of procurement within a predetermined error of other historically known outcomes of the mode of procurement correlated to other historically known needs of the at least one asset.

6. The system of claim 1, the plurality of program instructions further representative of the acts of:
   comparing the projected need of the at least one asset of a first user to the measured utilization of at least one other asset by a second user, the second user different than the first user and the at least one other asset of a same type as the at least one asset of the first user.

7. The system of claim 1, wherein the act of calculating the projected need of the at least one asset over the predetermined future time interval is based upon a trend of utilization of the at least one asset calculated over a predetermined historical time interval.

8. The system of claim 1, wherein the act of calculating the mode of procurement of the at least one asset is based upon at least one parameter of the group comprising a rental cost, a purchase cost, and a depreciation rate of the at least one asset over the future time interval.

9. The system of claim 1, wherein the act of calculating a mode of procurement includes executing a procurement algorithm that includes at least one parameter of the group consisting of a measured utilization of the at least one asset and a predicted business direction of services correlated with utilization of the at least one asset.

10. A computer implemented method of calculating a mode of procurement of at least one asset having at least one tracking element, the method comprising the acts of:

communicating with the at least one tracking element for the at least one asset to identify a location of the at least one asset via at least one programmed computer;

measuring a utilization of the at least one asset having a unique identifier over at least one time interval;

calculating a projected need of the at least one asset over a predetermined future time interval based upon the measured utilization of the at least one asset;

calculating a mode of procurement of the at least one asset based upon the projected need of the at least one asset using a recurrent neural network algorithm which comprises calculating automatically adjustable empirical weights using back-propagation, wherein back-propagation comprises using a predetermined error of historical input values to produce a historical outcome;

adopting the automatically adjustable weights into the recurrent neural algorithm; and displaying on a computer display the mode of procurement to the user;

wherein the act of calculating the projected need is based upon at least one parameter from the group comprising an upgrade factor of switching from an existing asset to a new asset, a predicted useful life of the at least one asset, a business adjustment factor representative of a business direction indicative of expansion of patient services in view of local competition, and a patient increase factor (PIF) representative of a projected increase in patient care.

11. The method of claim 10, wherein the act of measuring the utilization of the at least one asset includes calculating at least one average utilization of the at least one asset over a predetermined time period on a continuous basis, and wherein the mode of procurement includes one of the group comprising a purchase of the at least one asset and a rental of the at least one asset.

12. The method of claim 10, wherein the act of calculating the mode of procurement of the at least one asset further comprises using a plurality of parameters of projected utilization of the least one asset over different time intervals.

13. The method of claim 10, wherein an outcome of the recurrent neural network algorithm is a binary value representative of a mode of procurement of the at least one asset.

14. The method of claim 10, the method further including the act of testing whether the recurrent neural network algorithm produces an outcome of the mode of procurement within a predetermined error of other historically known outcomes of the mode of procurement correlated to other historically known needs of the at least one asset.

15. The method of claim 10, the method further including the act of comparing the projected need of the at least one asset of a first user to the measured utilization of at least another asset by a second user, the second user different than the first user and the at least another asset of a same type as the at least one asset of the first user.

16. The method of claim 10, wherein the act of calculating the projected need of the at least one asset over the predetermined future time interval is based upon a trend of utilization of the at least one asset calculated over a predetermined historical time interval.

* * * * *